(12) United States Patent
Schmidt et al.

(10) Patent No.: US 12,045,968 B2
(45) Date of Patent: Jul. 23, 2024

(54) BAKING PAN IMAGE CAPTURE SYSTEM

(71) Applicants: Norman Schmidt, Denman Island (CA); Orlando Janzen, Mission (CA)

(72) Inventors: Norman Schmidt, Denman Island (CA); Orlando Janzen, Mission (CA)

(73) Assignee: Food Machinery Engineering, LMTD

( * ) Notice: Subject to any disclaimer, the term of this patent is extended or adjusted under 35 U.S.C. 154(b) by 354 days.

(21) Appl. No.: 17/010,260

(22) Filed: Sep. 2, 2020

(65) Prior Publication Data

US 2021/0125326 A1 Apr. 29, 2021

Related U.S. Application Data

(60) Provisional application No. 62/894,922, filed on Sep. 2, 2019.

(51) Int. Cl.
*G06T 7/00* (2017.01)
*A21C 3/04* (2006.01)
(Continued)

(52) U.S. Cl.
CPC .............. *G06T 7/0004* (2013.01); *A21C 3/04* (2013.01); *A21C 3/10* (2013.01); *A23P 30/20* (2016.08);
(Continued)

(58) Field of Classification Search
CPC . G06T 7/0004; A21C 3/04; A21C 3/10; A23P 30/20; A47J 36/025; B05B 13/0221;
(Continued)

(56) References Cited

U.S. PATENT DOCUMENTS 5,531,832 A * 7/1996 McCalip ................. B05B 5/001
118/712
2007/0042139 A1* 2/2007 Cooper .............. G01B 11/0658
428/29

(Continued)

FOREIGN PATENT DOCUMENTS

JP 2015111088 A * 6/2015

OTHER PUBLICATIONS

Electrical Safety Code Manual, 2010, Incident Energy, 2010, https://www.sciencedirect.com/topics/engineering/incident-energy (Year: 2010).*

(Continued)

*Primary Examiner* — Marnie A Matt
(74) *Attorney, Agent, or Firm* — Tangent Law Group, PLLC; Eric J. Weierstall, Esq.

(57) ABSTRACT

The device relates to a method and an arrangement for visualization or to gauge conditions of the surface of coated materials on baking pans and formulations and applications of materials to enhance this visualization. Specifically, surfaces on baking pans used in the baking of common foodstuffs where coatings are applied to the pan with visual enhancement additives so as to improve the release of baked products such as but not limited to bread and rolls and like baked goods and visualization of the pans for damage, wear, imperfections, contaminants and other surface defects or abnormalities. The device includes a light and/or energy emitter which reflects light off of the pan surface, an image capture element receiving the reflected light and/or energy to form an image of the pan, a controller analyzing the image of the pan for the aforesaid abnormalities and reporting same.

27 Claims, 13 Drawing Sheets

(51) Int. Cl.
  *A21C 3/10*    (2006.01)
  *A23P 30/20*    (2016.01)
  *A47J 36/02*    (2006.01)
  *B05B 13/02*    (2006.01)
  *B08B 9/46*    (2006.01)
  *B26D 3/24*    (2006.01)
  *C09D 5/22*    (2006.01)
  *H04N 7/18*    (2006.01)

(52) U.S. Cl.
  CPC ......... *A47J 36/025* (2013.01); *B05B 13/0221* (2013.01); *B08B 9/46* (2013.01); *B26D 3/24* (2013.01); *C09D 5/22* (2013.01); *H04N 7/18* (2013.01)

(58) Field of Classification Search
  CPC ........... B05B 12/084; B08B 9/46; B26D 3/24; C09D 5/22; H04N 7/18; A21B 3/00
  USPC ......................................................... 118/713
  See application file for complete search history.

(56) References Cited

U.S. PATENT DOCUMENTS

| | | | | |
|---|---|---|---|---|
| 2013/0342824 | A1* | 12/2013 | Ponomarev | G01N 21/8422 106/14.05 |
| 2015/0081090 | A1* | 3/2015 | Dong | B65G 43/08 700/230 |
| 2019/0234617 | A1* | 8/2019 | Bhogal | F24C 3/124 |
| 2020/0048009 | A1* | 2/2020 | Moore | A21B 3/135 |
| 2021/0149312 | A1* | 5/2021 | Tel | B65G 43/08 700/230 |

OTHER PUBLICATIONS

M. Dulik and L. Ladanyi, "Surface detection and recognition using infrared light," 2014 ELEKTRO, Rajecke Teplice, Slovakia, 2014, pp. 159-164, doi: 10.1109/ELEKTRO.2014.6847893. (Year: 2014).*

Brogly, A.M., Privas E., Gajendran R.K., Bistac S. Tribological properties of non-stick coatings used in bread baking process, Proceedings of the 8th International Conference on Food Process Engineering; London, UK. Sep. 29-30, 2016 (Year: 2016).*

W. Meulebroeck, H. Thienpont and H. Ottevaere, "Photonics enhanced sensors for food monitoring: Part 3," in IEEE Instrumentation & Measurement Magazine, vol. 20, No. 5, pp. 46-55, Oct. 2017, doi: 10.1109/MIM.2017.8036698. (Year: 2017).*

Awad Ehab, Nano-plasmonic Bundt Optenna for broadband polarization-insensitive and enhanced infrared detection, Nature Research Scientific Reports, 9:12197, www.nature.com/scientificreports (Year: 2019).*

H. Blasinski, J. Farrell and B. Wandell, "Simultaneous Surface Reflectance and Fluorescence Spectra Estimation," in IEEE Transactions on Image Processing, vol. 29, pp. 8791-8804, 2020, doi: 10.1109/TIP.2020.2973810. (Year: 2020).*

Ashokkumar et al., Selection Criteria and Methods for Testing Different Surface Materials for Contact Frying Processes, PhD Thesis, National Food Institute (Year: 2010).*

* cited by examiner

Corrected Figure

Corrected Figure

Corrected Figure

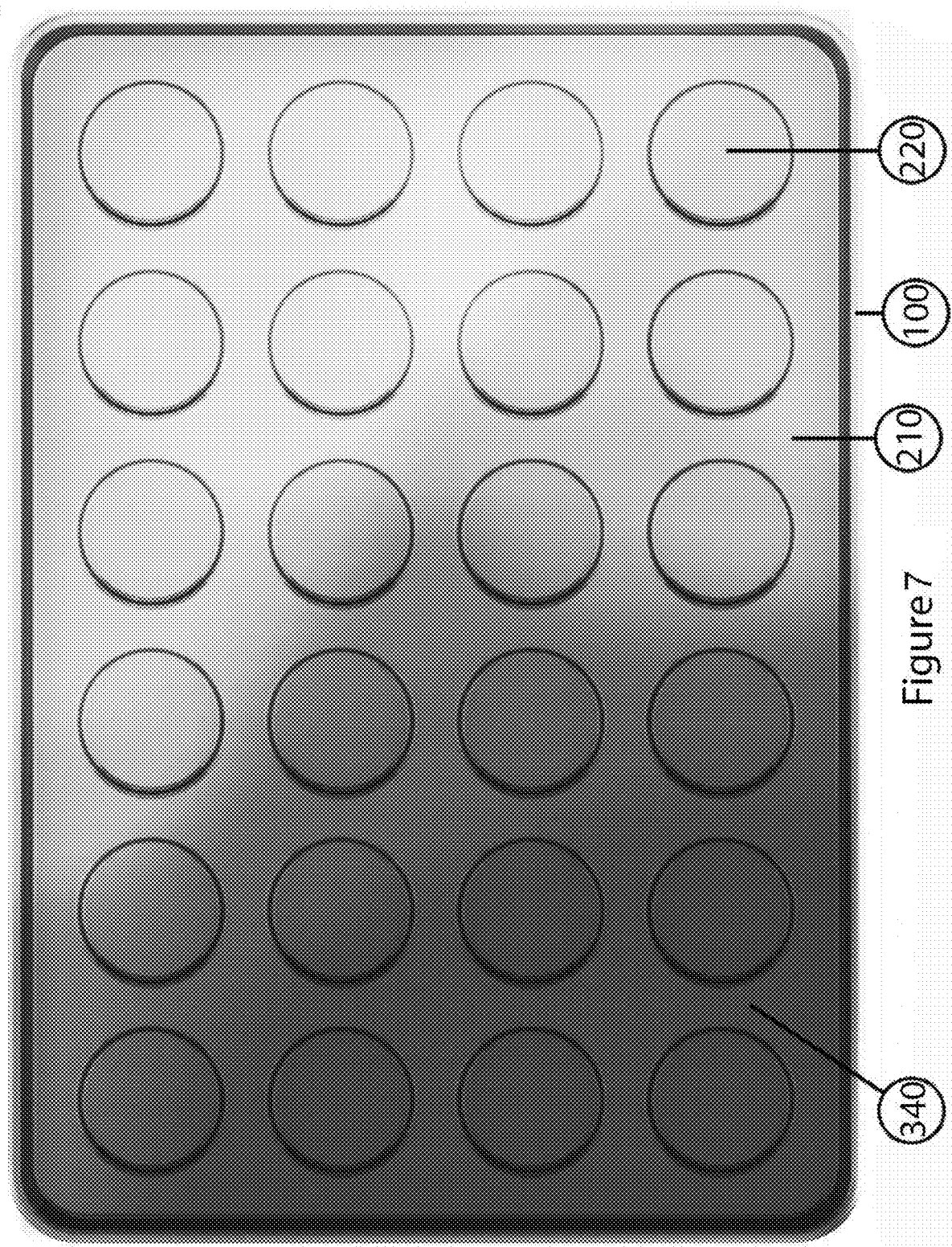

BAKING PAN IMAGE CAPTURE SYSTEM

CROSS-REFERENCE TO RELATED APPLICATIONS

This application claims the priority of U.S. provisional patent application 62/894,922, filed Sep. 2, 2019, which is incorporated herein by reference.

FIELD OF THE INVENTION

The invention relates to a method and an arrangement to visualize or gauge conditions of the surface of coated materials on baking pans and formulations and applications of materials to enhance this visualization. Specifically, surfaces on baking pans used in the baking of common foodstuffs where coatings are applied to the pan with visual enhancement additives so as to improve the release of baked products such as but not limited to bread and rolls and like baked goods and visualization of the pans for damage, wear, imperfections, contaminants and other surface defects or abnormalities is provided by the instant invention.

BACKGROUND OF INVENTION

With prior art baking processes before the development of non-stick coatings, a baking grease or oil would be put onto the food contact surface of the pan which provided a low adhesion coating that would prevent or reduce the likelihood of the materials to be baked from bonding to the metal surface. Issues with the application of these types of materials in these prior art processes included the cost of coating materials as well as cost of application of the material. In the early days of commercial baking people would have to manually apply the coatings to the pans. Then further developments in the industry resulted in machines that would apply the coating by spraying or other means. Application of these release agents had the effect of improving the release of baked products but also had issues with buildup and the need for cleaning. If one did not clean these built up release agents then there would be the possibility of carry over where materials could come loose from the pan and go into or onto the surface of edible baked goods.

There was an advent of adhesion reducing materials typically available as non-stick glazes that were applied to the pans. These materials included specific low adhesion families of materials or mixes of such materials like silicones, families of fluoridated materials e.g. TEFLON, and the like in glazes and other applications. These modern commercial baking release agents are usually permanent to semi-permanent applications to the pan. They are sprayed on as layers or glazed on as material coatings, typically as wet chemical applications where wet mediums are transport agents and the coatings are then baked to activate and or complete the conversion from a coating to a hard finished surface and to drive off all volatile or non-volatile transport mediums or to set or sinter powdered material alone or together with bonding agents or adhesion mediums to hold the release medium and fix it to the coating of the pan.

The most frequently used release agents are silicone glazes and TEFLON coatings including reinforced TEFLON compositions where a ceramic powder is mixed in and acts as a mechanical protector of the TEFLON to enhance the longevity of the coating. These coatings are often used to aid in releasing baked goods in commercial baking processes and thereby reduce the adhesion of materials to the surface to which the coatings are applied. Coatings may also be applied or be present so as to allow for a means to provide release of products from a surface such as in the baking industry when producing products such as but not limited to bread and rolls and the like from machinery.

These release agents are beneficial in aiding satisfactory release of materials from the surface of the likes of baking pans and are typically permanently, as is the case with TEFLON, or semi permanently, as is the case with most silicone glazes, applied to the pans. But over time the non-stick coatings, including TEFLON and silicone glazes, do wear and the non-stick properties on these coated bakewares often become non uniform (e.g. cut, torn, chipped, scratched, etc.). Additionally, due to the size and complexity of commercial machine operations, it is often the case that some pans that are coated are used less often than others. For example, when a run of product is made and pans are used but the run of product is smaller or less than a full run therefore only a percentage of pans are used. Unless indexed, which is unlikely, it is most likely that the first pans will receive more cycles than the pans that are never used because the run size is not large enough to get to the last pans that are in the stacks of stocked pans. Typically, there is no rotation of these pans, e.g. those unused pans do not get moved to the front for use in the next run. This results in some pans with higher usage and others with lower usage and coinciding levels of wear of the coating materials on the pan.

Inconsistent usage also means that often pans with limited coating wear get lumped into batches of pans where the release coating was depleted to a point where it is or should be necessary to reapply or recoat the pan. This can affect the consistency of operations as the under used pans are fine and the overused pans cause problems in the line. Thus it is often the case in the industry that pans that have lower wear are lumped together with pans that have higher wear and all are deemed as needing recoating and together are sent out for recoating. This is a less than efficient means to manage the pan stock and adds costs to the commercial baking operations through unnecessary recoating. It also means that typically a commercial bakery operation would need two sets of pans to be in stock and rotate these sets of pans when one set is sent out for re-coating. This can also result in surges in re-glazing operations.

Thus there exists a need to find a means of viewing or assessing the condition of the coating on the pans so as to take the pans that need re-coating out of operation and leaving the pans where the coating is still adequate for continued usage until recoating is required. Additionally, this enhanced visualization can aid in confirming quality control of the initial glazing application or subsequent re-glazing applications. Not only would such a device and method reduce re-glazing cost, it would also reduce the excess number of pans that a firm would need to have in stock and the surge of pans that would arrive at pan re-coating facility permitting better facility operation.

The coating, method of visualization and visualization device would also meet the need of viewing or gauging the condition of the pan in related baking processes that necessitate visual enhancement or a process that increases the visual contrast for improved visualization of the condition of the coating. This enhanced visualization process can be utilized for, but is certainly not limited to, gauging cleanliness of pans in a commercial baking operation where as an example there may be toppings added to the surface of the baked product such as seeds, flour, seeds or coarse grains to enhance flavors and or appearance or both which may get adhered. Typically in these application processes water is sprayed onto the surface of the product prior to the product being baked as well as the topping medium being applied to the surface of the products. But while this occurs, some water and topping materials may miss the surface of the baked product and adhere to the pan surface.

Issues with these bonded on materials can occur when they adhere to the coated surface of the pan. It is often the case that they can be bonded strongly enough to remain on the pan for several baking cycles to the point that they will blacken or carburize and then break loose and go into the products. At best one would be to be able to well spot or see these deposits and when possible provide an appropriate level of cleaning action so as to remove the adhering materials. In addition to affecting the look and taste of the resulting product, these types of bonded material can also present allergen issues.

These bonded materials however are often not easy to observe and to fully or properly identify in automated processes much less using human operators or just the naked eye. Often different types of light or light energies both in human visible and human non visible spectrums may be used but they still cannot guarantee optimal viewing or detection of adhering materials. So the instant invention also meets the need for enhanced viewing and automated scanning of the target pan for foreign materials. Thus a further need exists for a system to assist in detecting extraneously bonded or non-released materials on the pans beyond that simply available to standard cameras. A further need exists for a system for illuminating the coating to detect both the state and condition of the coating on the pan as well as the presence of any unintended adhered materials. The formulation, methods, and apparatus of the instant invention address these long felt needs.

The invention is directed to an apparatus to provide means to determine the condition of the release agent on a pan as well as whether debris exists on the pan. This visualization of the coating condition can aid in effective re-coating when needed and not in a batch basis where good and bad pans are all grouped as one and sent out as well as damaged pans that need to be removed and as well as a system for viewing the uniformity and thickness of the release coating at production at the pan facility for manufacture and after use for determining when recoating is necessary.

SUMMARY OF THE INVENTION

An aspect of the invention is to provide a means of viewing or assessing the condition of a non-stick or adhesion lowering coating on the pans to aid in determining when recoating is required and also reduce the excess number of pans that a firm would need to have in stock due to unnecessary re-glazing of pans.

A further aspect of the invention is an enhanced visualization aid in confirming quality control of glazing applications or subsequent re-glazing applications on baking pans.

A still further aspect of the invention is to provide for a coating, method of visualization and visualization device to view or gauge the condition of a pan in a baking processes An aspect of the invention is a formulation of a material additive in a coating or a coating and process of using that material additive that increases the visual contrast for improved visualization of the condition of the baking pan.

Another aspect of the invention is an enhanced visualization process gauging cleanliness of pans in a commercial baking operation based on visualization of a coating with an enhanced visualization material or agent on the baking pan.

A still further aspect is a method for visualizing the surface of the a baking pan for excess baked product materials such as but not limited to seeds, flour, seeds, coarse grains, glazes, product pieces, excess product or other adhered materials using an enhanced visualization coating material on the pan.

A further aspect is to provide an invention for enhanced viewing and automated scanning of a target pan for foreign materials.

An aspect of the invention is to provide a system to assist in detecting extraneously bonded or non-released materials on a pan beyond that simply available to standard cameras.

A still further aspect provides for a system for illuminating a coating to detect both the state and condition of the coating on a pan as well as the presence of any unintended adhered materials.

An aspect of the invention is to provide an improved method of visualizing the state of a release or adhesion lowering coating on a baking pan with an enhanced visualization material added to the adhesion lowering coating.

Yet another aspect of the invention is to provide a controller with a weighted decision making hierarchy to automatically review data from the image system and determine if a pan is non-uniform by reviewing the data from the imaged enhanced visualization coating on the pan and comparison threshold variable values.

The invention includes an article of manufacture, an apparatus, a method for making the article, and a method for using the article.

The apparatus of the invention includes a baking pan image capture system in a commercial baking manufacturing device. The device having an image capture element with an incident energy source emitting incident energy. A treated baking pan having an enhanced visualization coating reacting to the incident light emitted by the incident light source and reflecting it in such a way as to be read by the image capture element. A controller communicates with the image capture element, captures an image of the treated baking pan during the commercial baking process and displays the image.

The controller can be adapted to generate and review digitized value data from the image derived from the image capture element and interprets the digitized value data related to an image field. The digitized value data is representative of values across the image field of at least the brightness of individual elements of the image or subsets or combinations of these values. The apparatus further comprising an at least one memory storage device storing stored variables or thresholds of data representative of a reference value and the stored variables or thresholds being accessible by the controller as a comparison to the digitized value data.

The incident energy emitted from the emitter is not fully reflected from the treated baking pan such that the emitted light does not appear at the expected intensity in the captured image field when compared to the expected stored variables by the controller. The less than fully reflected light and resulting data indicate one of at least an adhering product and/or an area of significant wear in the enhanced visualization coating and interferes with the reflection of incident energy.

The baking pan image further including a commercial baking pan cleaning system in communication with the controller, whereby the image field and the digitized value data indicating cleanliness of the pans in the commercial baking pan system. The baking pan image capture system further comprises a sorting station, where the controller is adapted to review the image field and the digitized value data to determine the cleanliness of the pans in the commercial baking pan system and sorts the pans based on this determination. The review of the image field by the controller is determined by comparison to threshold value that is exceeded or that through a weighted matrix scoring of the condition of the pan to determine how to sort the pan.

The apparatus of the invention includes an apparatus that coats a baking pan with an enhanced visualization (EV) coating including a conveyor, a pan with an upper surface and a lower surface stamped therein, an at least one spray nozzle head, and an at least one non-stick coating material with an EV material supply coupled to the at least one spray nozzle, where the apparatus conveys the pan on the conveyor to the at least one spray nozzle head and the at least one spray nozzle head sprays the non-stick coating material with the enhanced visualization material therein as an at least one uniform layer on at least the upper surface of the pan.

The at least one spray nozzle can have multiple spray nozzle heads. The multiple spray nozzle heads can point in multiple directions in differing angles of inclination to provide even and complete coverage. The at least at least one uniform layer further includes a first layer of primer applied prior to the layer non-stick coating material with the EV material. The at least one uniform layer can include more than one layer of non-stick coating material with the EV material.

The method of the invention includes a method of visualizing the surface of a baking pan including the steps of irradiating the pan with an energy source, reacting the energy with an visualization enhancing coating on the baking pan, capturing an image of the re-emitted light from the source, and displaying the image.

The apparatus of the invention includes an image capture system in a commercial baking manufacturing device with an image capture element and an incident light source. A treated baking pan having an enhanced visualization coating reacting to the incident light emitted by the incident light source and a controller where the image capture element captures an image of the treated baking pan during the commercial baking process and displays the image.

The article of manufacture of the invention includes a pan having a non-stick coating including at least one layer of enhanced visualization material.

The invention includes a formulation for a non-stick or adhesion lowering release coating comprising an at least one part enhanced visualization compound. The compound having a polymer resins coatings with an enhanced visualization material comprising or consisting of at least one molecule of xanthene, ketone, imine, acridine, coumarin, stilbene, bistriaziny laminostilbenedisulfonic acid, bisstyrylbiphenyls, bis-styrylbenzenes, bistriazolylstil benedisulfonic acid and naphthalimide molecular structures. The formulation can also include a pigment selected from the group consisting of RADGLO GRT, RADGLO RPCF, GLOPRILL GPF Series, SILC PIG, EPSILONG EQ SERIES, ALLURA RED, SOSA GLOW, and Quinine.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

FIG. 7 shows a view from the camera that would typically show when surface and pigment of the non-stick EV coating is misapplied during application processing.

DETAILED DESCRIPTION

Figure 1:
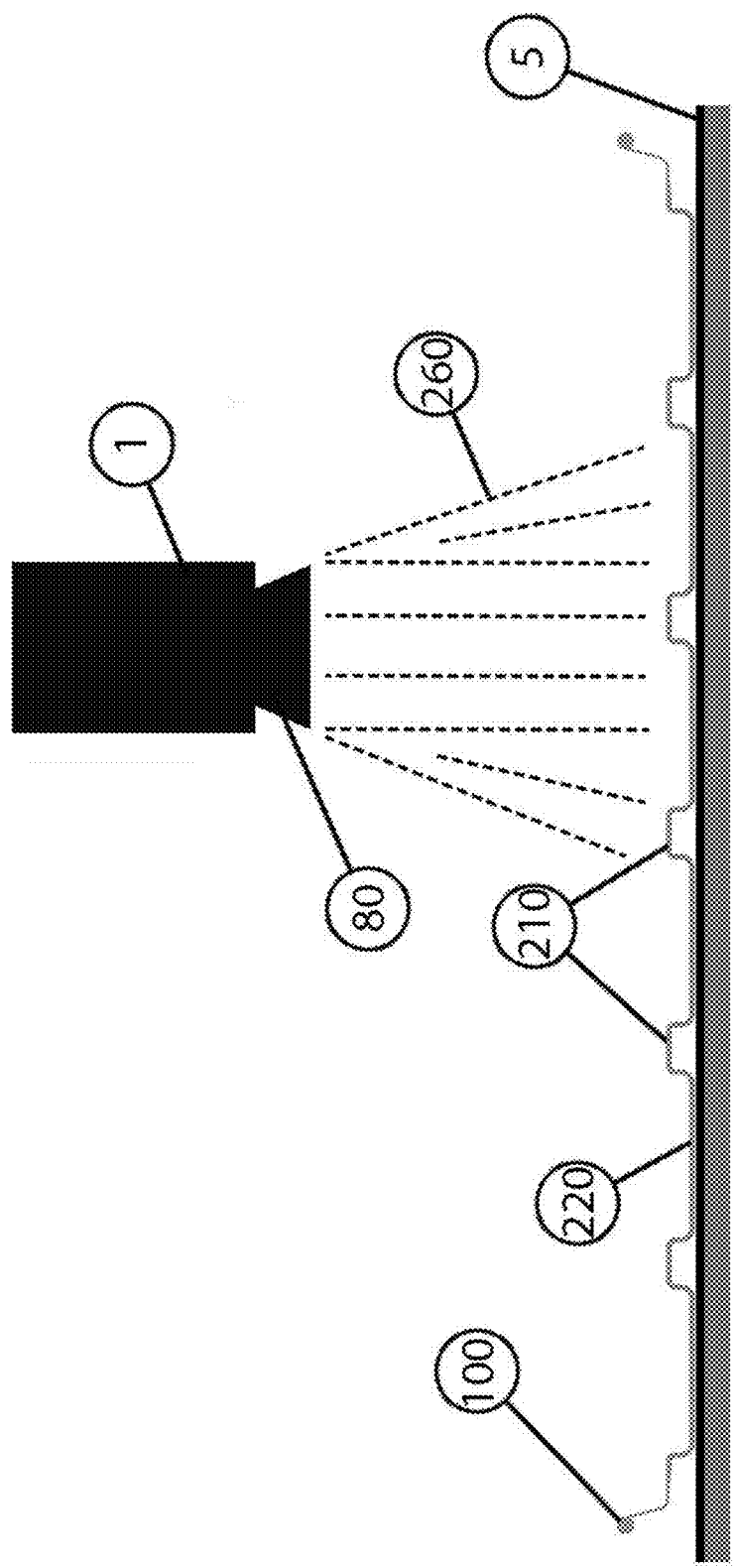
FIG. 1 shows an isometric view of an exemplary embodiment of the coating machine of the instant invention.

The invention includes a material, method, and apparatus to enhance the viewing of a surface or applied coating condition on a baking pan. The instant embodiment includes application of materials in the non-adhering or non-stick coating of the surface of a baking pan to facilitate better assessment of the surface for the purpose of applying corresponding cleaning activity of the pan alone or together with the assessment of the quality of the coating or surface of the material whether it be for new or deteriorating levels of coverage for coatings on the pans.

There are a wide range of pigments and additives that can be added to provide for optical differentiation and enhanced visualization. These include additives, dyes, pigments, and the like that fluoresce or phosphoresce or luminesce when exposed to varying incident energy emissions or light. This phenomenon can occur under daylight, or light generated by standard means such as incandescent, fluorescent, LED, metal halide, etc. The emitted light may also be of varying wavelengths. Infrared and or black light/UV light are but just two examples which when introduced as incident light on the appropriate pigment in a coating material can show up vibrantly under the incident light, providing significant optical contrast.

This invention utilizes aspects of pigments or other additives like these that can be viewed under different light spectrums so as to provide benefit for viewing the top surface of a pan. These can be in the form of, for instance but are not limited to, dopes and pigments added to or as a separate part of an existing coating or glaze mixture or formulation. These materials share common properties in that they are materials or additives that are food grade or food contact compliant, resistant to baking temperatures, and compatible for incorporation into baking pan coating formulations. These additives can include materials that luminesce, fluoresce, photoluminescence, phosphoresce or similarly emit or enhance visualization through emission when controlled energy stimulation is provided.

These can include but are not limited to, as non-limiting examples, fluorescing pigment additives in the form of dyes and pigments that contain fluorescing components within their molecular structure. Fluorescent pigments are solid particles, can be between about one and fifty micron in size but most typically up to about twenty five microns in size, that do not dissolve in the resin matrix of the coating. They are typically prepared by incorporating fluorescent dyes onto polymer or inorganic carriers. Fluorescent pigments are added in the polymer resin to impart color and fluorescence. The ratio for the fluorescent pigment can be any functional ratio, as determined by the resin and the application, but is most typically about 0.1-5%, more specifically about 1% by weight of the mixture by weight.

Some examples of fluorescent molecular components that can be used and dissolve in typical polymer resins coatings include molecules with xanthene, ketone, imine, acridine, coumarin, stilbene, bistriazinylaminostilbenedisulfonic acid, bisstyrylbiphenyls, bisstyrylbenzenes, bis-triazolylstilbenedisulfonic acid and naphthalimide molecular structures. There are several existing commercial fluorescent additives that can, again as non-limiting examples, which be used but are certainly not limited to provide the desired fluorescence for the aforementioned baking pan coating, these include but are certainly not limited to RADGLO GRT, RADGLO RPCF, GLOPRILL GPF Series SILC PIG EPSILONG EQ SERIES, ALLURA RED, and Quinine.

For enhanced visualization and assessment of this surface or the applied materials on said surface the additive material can be added to the adhesion lowering or non-stick coating when applied to the pan, a silicone glaze post coating over a non-stick bake on coating when applied to the pan, the reglazing of a silicone glaze coating, or applied to an existing coating. This enhanced visualization material and material layer provides a high degree of visual contrast in a camera or within the visual spectrum of the human eye when fluorescing. This can be done for a variety of non-limiting purposes, which can include but are certainly not limited to detecting adhering materials such as baked on foodstuff material, detecting wear in a non-stick or release coating on the pan, detecting the evenness of an applied non-stick or release coating, and similar processes where high optical contrast providing enhanced visualization would provide useful data.

In one non-limiting example, further detailed below in relation to FIG. 5, this material can be used to visualize and illustrate the presence of adhering materials through the localized absence or reduction in re-emitted light or by effectively highlighting around a variation in the intensity of the emitted or reflected radiation. This can occur, for example but is certainly not limited to, when an adhering material blocks the emitted light and thereby reduces the re-illuminating effect or blocks emitting energy or reflecting energy from being created. In a further non-limiting example, it may indicate deterioration of the coating having the enhanced visualization material. This would be viewed as a dark spot or area in an otherwise illuminated area, as more particularly described herein in relation to the illumination and visualization device of the instant invention and images produced thereby.

To prepare a pan for such use, for instance, the relevant pigment in a release or non-stick mixture in the instant invention can be added to a surface of the pan during final processing or re-processing of the pans non-stick coating surface, a process commonly referred to as a glazing. The glazing layer serves to allow for easier and more predictable release of baked product from the pan after baking is completed. When the pans are manufactured this release coating is sprayed onto the pan surface and typically baked onto the pan at high temperature to transform the release agent or glaze and create a reduced adhesion or "non-stick" coating. Alternatively, this can also be used in addition to an existing coating on the pan, the pigment material being sprayed on with a formulation and baked on to transform the sprayed on coating into a layer on top of the hard uniform finish of the existing release agent. In either case, the resulting mix is suitable for the pan which contains the baked foodstuff or product and in which the baked foodstuff is baked and then released in a commercial baking process. As noted, the glazing process is usually sprayed on and a description of an exemplary embodiment for applying the mixture follows.

FIG. 1 shows an isometric view of an exemplary embodiment of the coating machine of the instant invention. A conveyor 5 conveys pans 100 to a coating machine 1. The non-limiting example of the pan 100 is shown having an upper surface 210 and a cup or lower surface 220 stamped therein. The coating machine 1 sprays the materials for each layer on the pan 100 with a spray nozzle head 80. The coating machine 1 can have multiple nozzle heads or make multiple passes and in multiple directions with spray nozzles operating in differing angles of inclination to achieve even and complete coverage and to deposit the multiple layers. These layers can include, but do not require, a primer 250 on the bare metal surfaces 210, 220 as described in further detail in relation to FIG. 2. A further layer of an adhesion lowering or release or non-stick coating that includes the enhanced visualization material is applied as a further layer or coating, the enhanced visualization material layer or illumination enhancing material or enhanced visualization (EV) coating 260 is shown. It being understood that the reference to the layer or coating is in fact a reference to what is most likely the result of several layers of the material as applied so as to provide a uniform and complete finished layer of EV coating 260 either alone or in conjunction with layers of another release agent or glaze on the pan surfaces 210, 220 forming the coating layer or EV coating 260 on the pan surfaces 210, 220. The EV coating 260 is then dried, in a non-limiting example being for instance in a curing oven. The resulting pans 100 are provided with an evenly distributed layer of release agent with enhanced visualization material in the EV coating 260.

Figure 2:
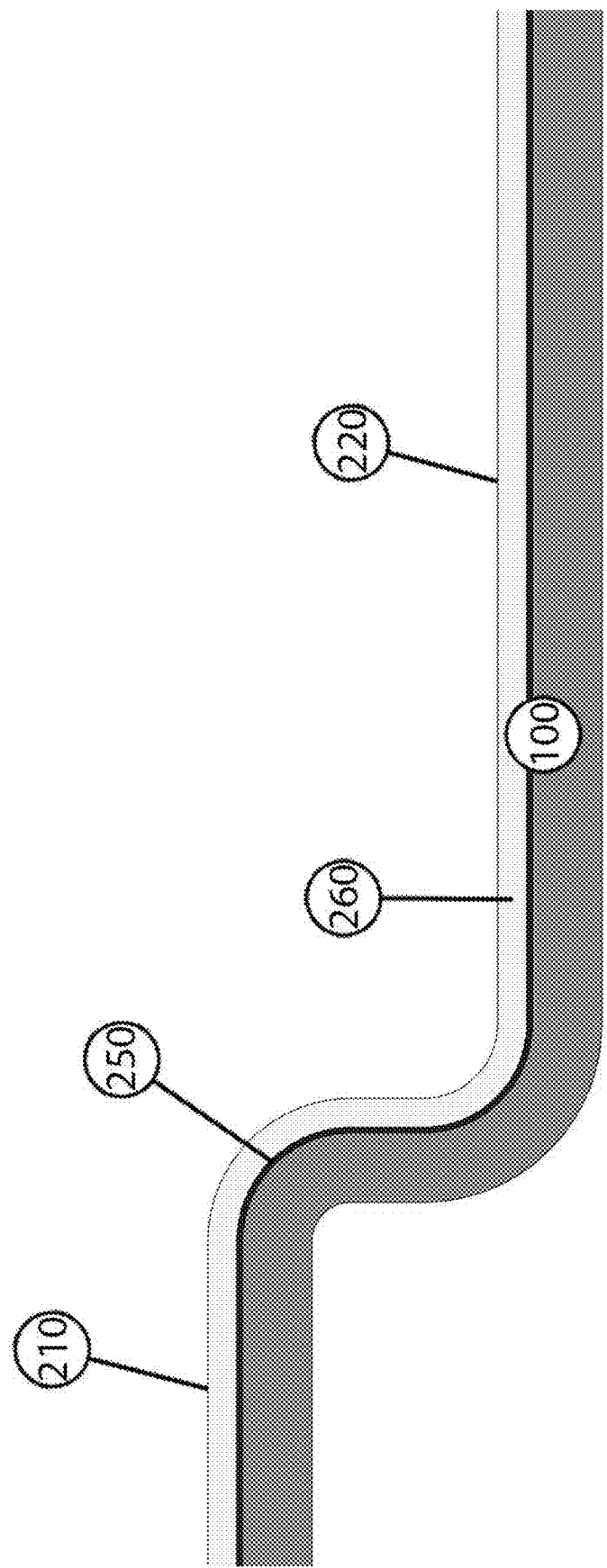
FIG. 2 shows a cross section of an exemplary pan having an applied enhanced visualization glaze on a baking pan.

FIG. 2 shows a cross section of an exemplary pan having an applied enhanced visualization glaze. In the cut away section of the exemplary embodiment of the bun pan has a cup or lower level 220 which is stamped or formed in a top surface 210 of the bun pan 100. Though a bun pan is depicted, it should be well understood that the instant invention applies to all bakewares, trays and pans or similar items, both with the as depicted bun pocket area as well as items that are a solid flat tray, used in commercial baking and the use of the bun pan is as a non-limiting example of such implements. Above this the exemplary embodiment includes, but is not required to have, a base coating or primer 250 which is bonded onto the pan surfaces 210, 220. Alternatively, pans may be of a ferrous metal base body with an aluminized coating which is porous where the EV coating 260 can be baked on as a surface which may result in no primer being necessary. The base coating or primer 250 typically gives a better bonding ability of the layer of the release or coating 260.

The EV coating 260 will typically be a material that provides a bake surface that provides a high degree of non-stick or non-adherence so as to release the buns that are baked onto the surface of the pan 100. In this exemplary embodiment, as a non-limiting example the EV coating 260 is a luminescing material which will luminesce when exposed to the energy or light 280 emitted by emitter 270 shown in FIGS. 3-5. This causes the pan EV coating 260 to light up when the reflected or reacted light 290 emits and travels towards the camera 300 so as to be viewed by the camera 300 in machine or machine portion for illumination and exposure of the pan EV coating 260.

Figure 3:
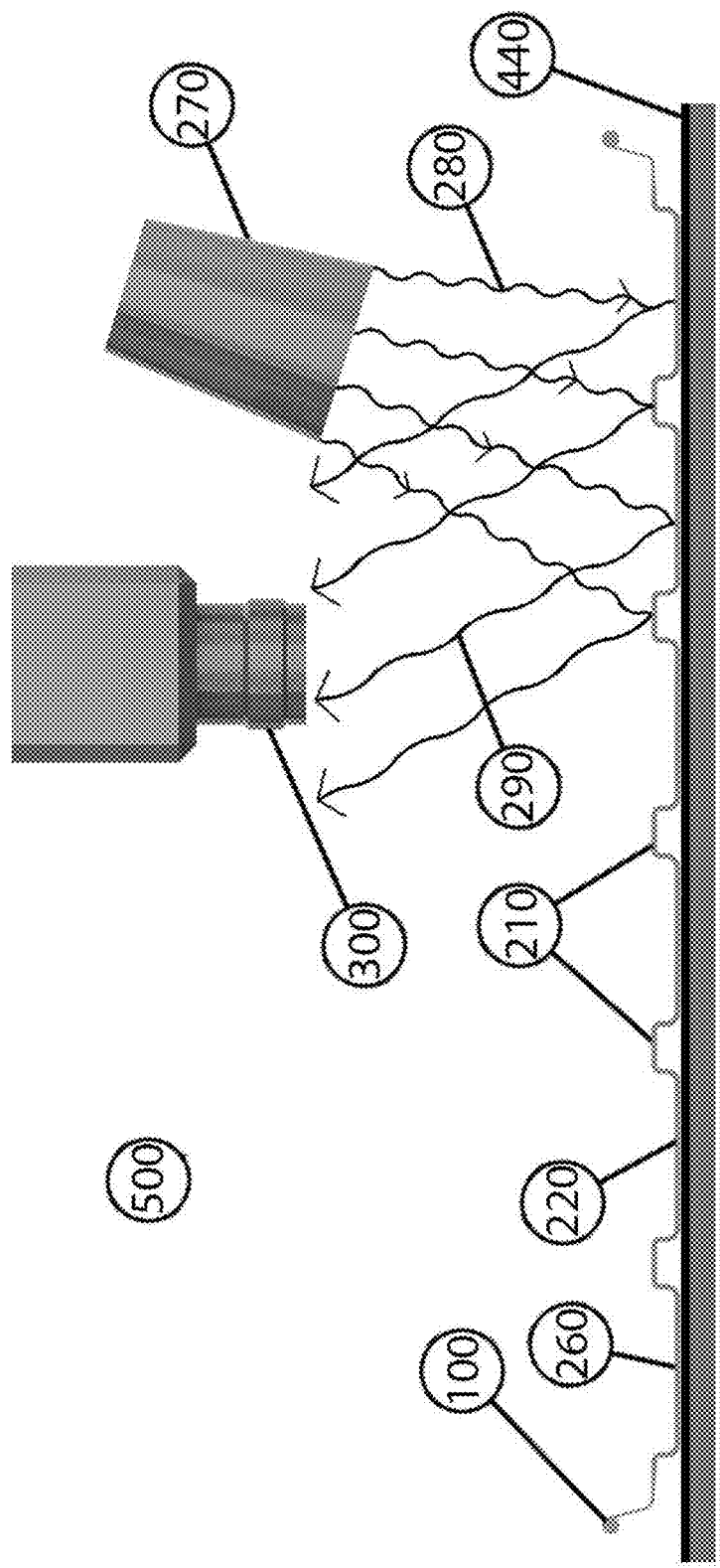
FIG. 3 shows a further cross section view of an exemplary embodiment of the illumination and visualization device of the instant invention.

FIG. 3 shows a cross sectional view of an exemplary embodiment of the illumination and visualization device of the instant invention. The device is shown having a conveyance device 440, shown in a non-limiting example as a conveyor 440 but which can also be or include a grid support or similar conveyance mechanism, which moves baked goods pans 100. As noted, the enhanced visualization material as applied in the EV glaze layer 260 re-emits or reflects energy when subjected to certain incident energy forms or frequencies in the form of, in one non-limiting example, the illumination in the ultraviolet (UV) spectrum emitted by energy source or emitter 270, here a UV light.

This incident light 280 from emitter 270 is reflected and/or re-emitted or fluoresced light 290 from the EV coating 260 on the pan surfaces 210, 220 which can be used to then illustrate the presence of adhering materials through localized absence or reduction in the reemitted light 290 or by effectively highlighting around a dark spot or alternatively or simultaneously being used to analyze the condition of the EV coating 260 on the surfaces 210, 220 with receiver or camera 300. This is accomplished with the illumination and visualization device 500 of the instant invention. In this non-limiting example these are shown as bun pans with a top surface 220 and pockets 210 stamped therein similar to that shown in FIG. 2 with a layer of the EV coating 260. The pans 100 are shown on the conveyor 440 which carries the pans 100 thru the illumination and visualization system 500. This illumination and visualization device 500 can be used in a number of circumstances for example, but certainly not being limited to, verifying the uniformity of a freshly glazed or reglazed pan 100 with the illumination enhancing material or EV coating 260, check for wear in the glaze of a used pan, visualize non-glazed or excess product left on a pan, or similar visualization processes.

Figure 4:
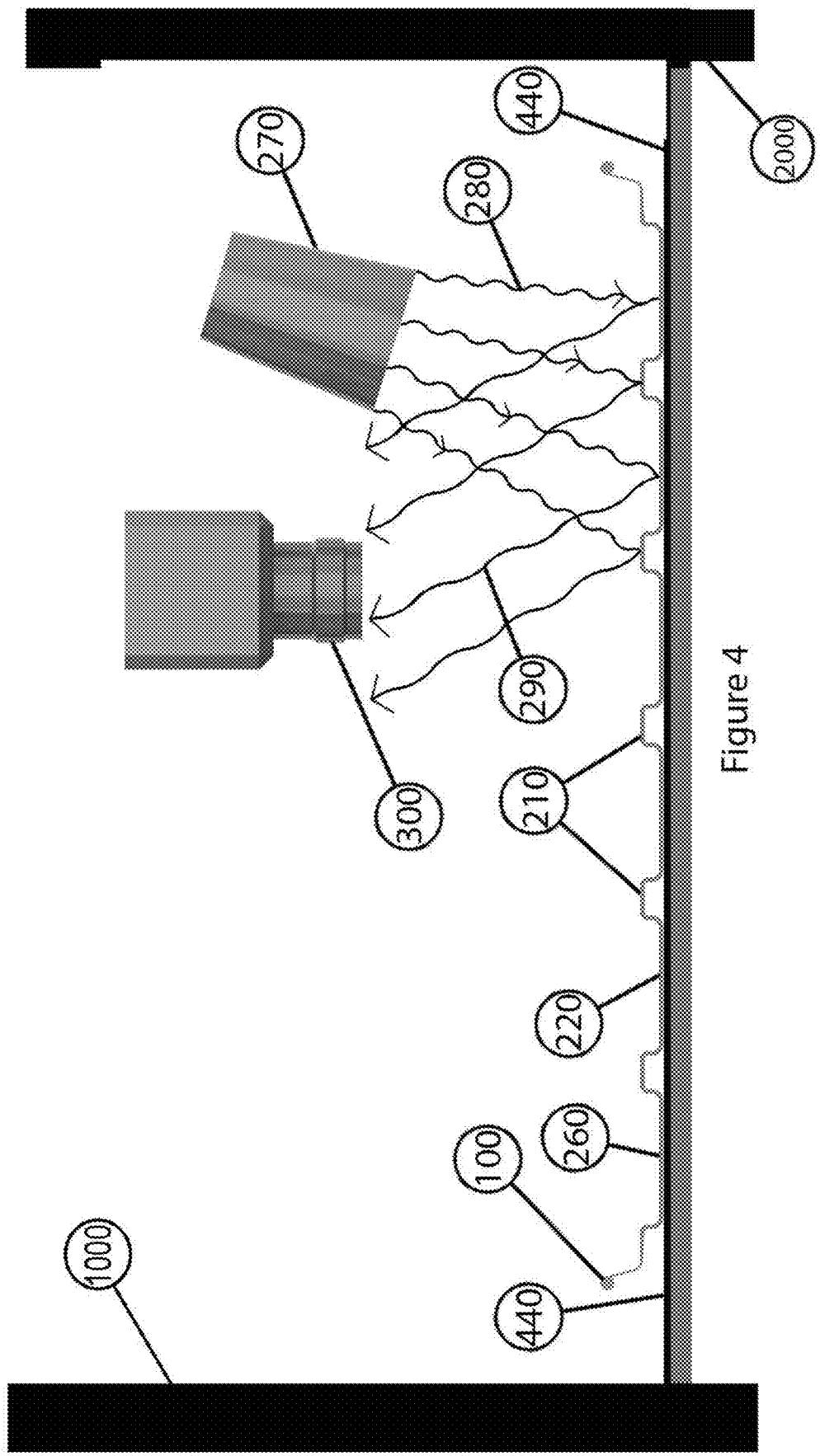
FIG. 4 shows a cutaway plan view of the illumination and visualization device of FIG. 3 in a glazing application quality control process.

FIG. 4 shows a cutaway plan view of the illumination and visualization device of FIG. 3 in a glazing application process. As noted herein, the illumination and visualization device or system 500 can be used in a number of circumstances including verifying the uniformity of a freshly glazed or reglazed pan 100 with the illumination enhancing material or EV coating 260. In this instance of the invention, the illumination and visualization device with its conveyor 440 is coupled to the material application device 1000 disclosed in FIG. 1 and a coating curing oven 2000. In this way, the further illumination and visualization device 500 has a conveyor 440 passing freshly glazed or re-glazed pans 100 upon it. The illumination and visualization device 500 operating substantially as disclosed in FIG. 3. The freshly glazed pans 100 having a layer of EV coating 260 sprayed and baked on it as described above.

Figure 6A:
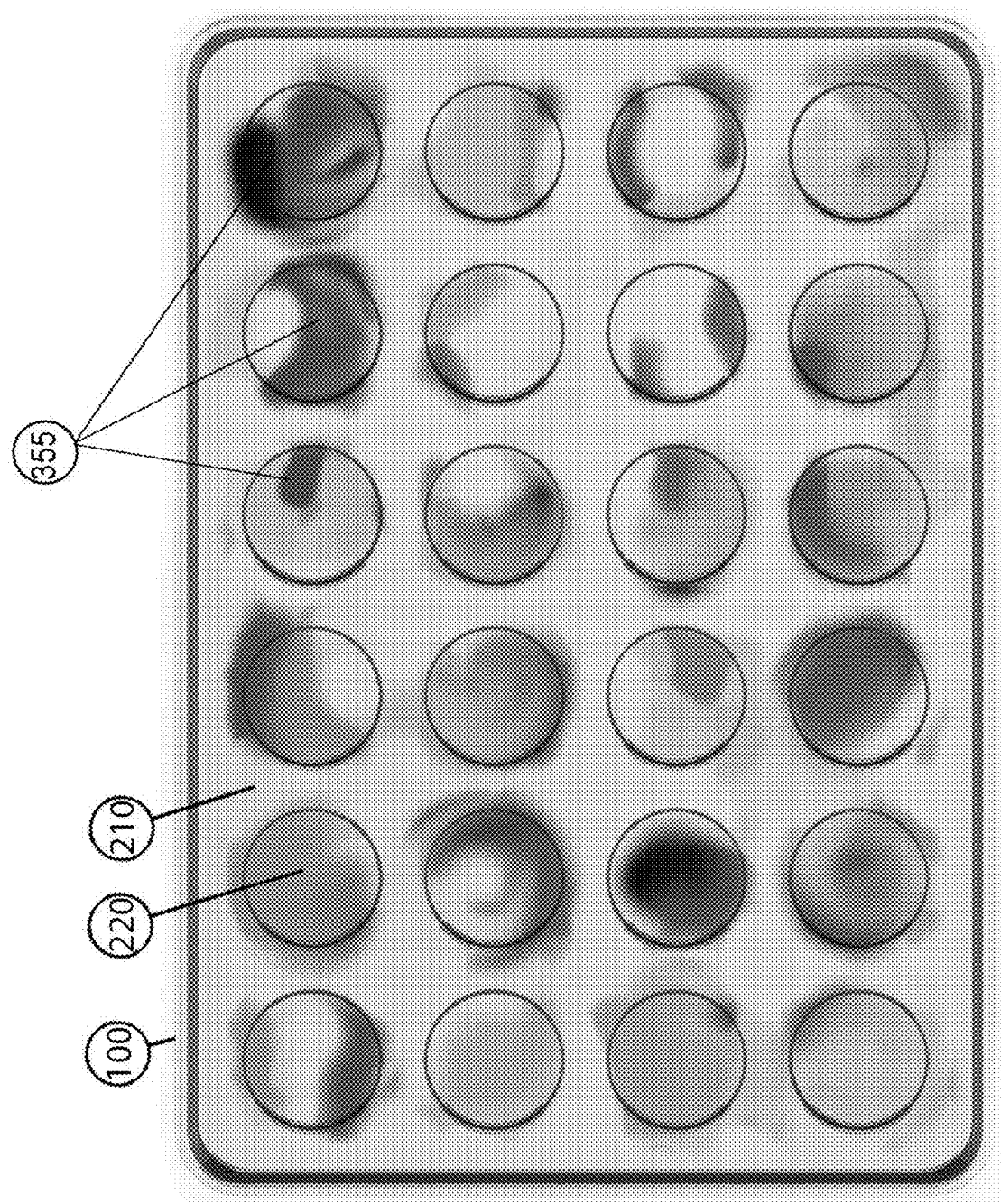
FIG. 6A shows a top down image of a pan visualized by an exemplary embodiment of the device of FIG. 3 showing signs of wear.
Figure 6B:
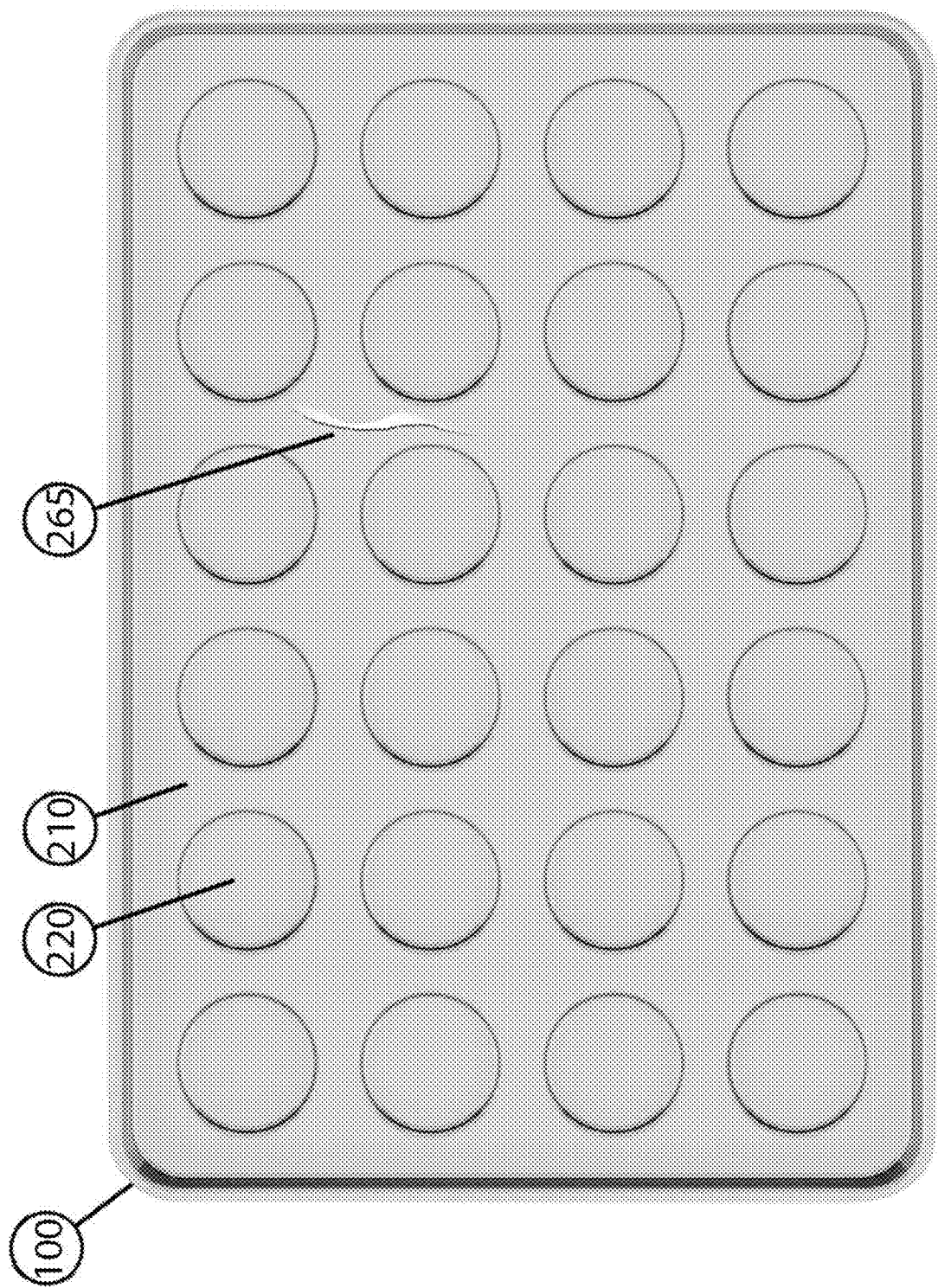
FIG. 6B shows a further image of a tray taken by the imaging and visualization device of claim 3 showing damage to the glaze from handling.
Figure 6C:
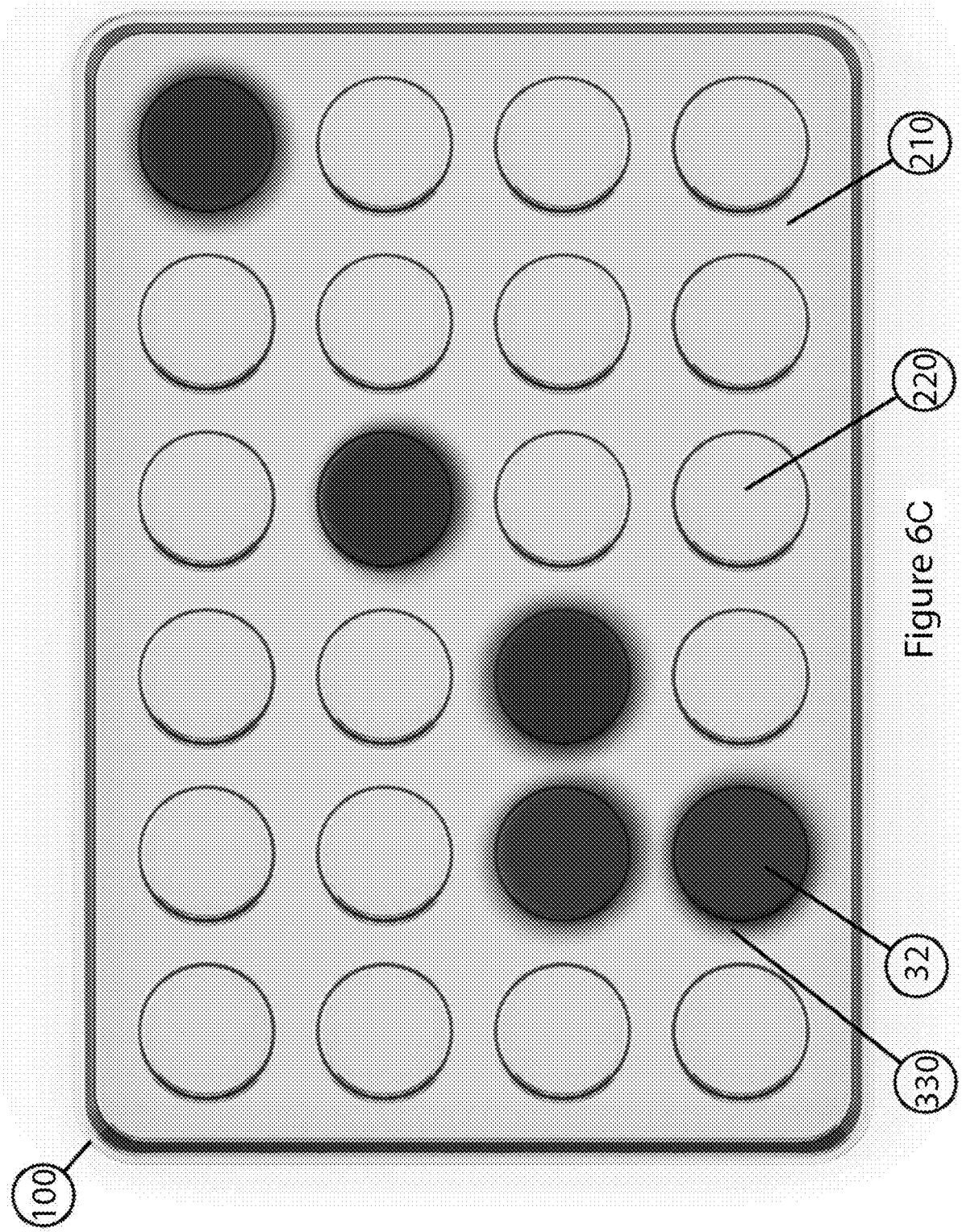
FIG. 6C shows a further image of a tray taken by the imaging and visualization device of claim 3 showing deterioration from localized overheating.

The pans 100 pass through the illumination and visualization device 500 such that incident energy from the energy source or emitter 270 strikes the freshly glazed or re-glazed pans and the camera or imaging element 300 receives an image of the pans 100 to confirm the application of the layers of the EV coating 260. Ideally, an image should be returned showing an even response from across the pan showing proper and adequate even coverage of the EV coating 260 on the pan 100. If the EV coating 260 is not applied properly, a shadow or variation or dark spot would appear, not dissimilar to the wear shown in FIG. 6A or the spots from overbaking or other imperfections from handling as shown in FIGS. 6B-6C herein below.

Figure 5:
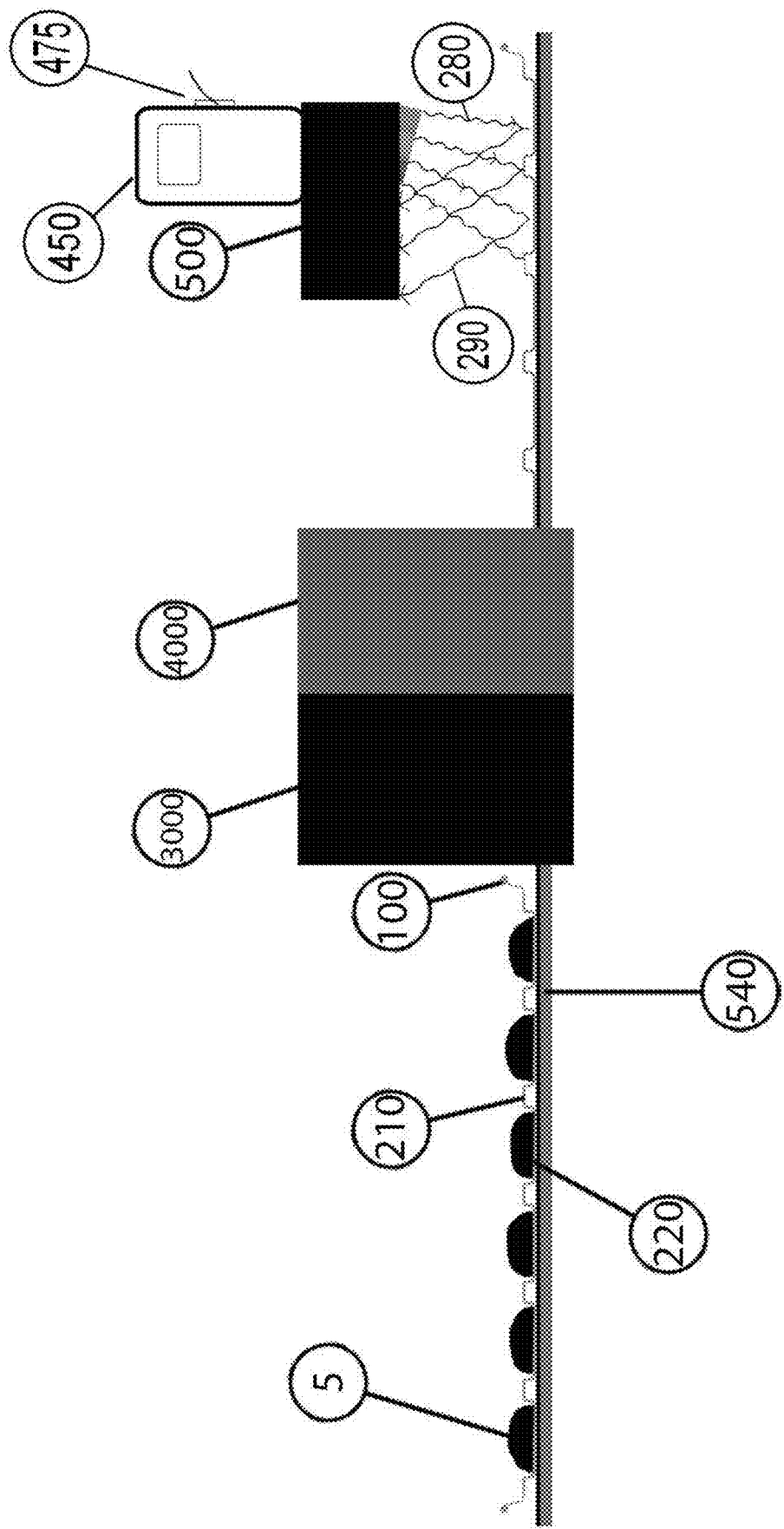
FIG. 5 is a cut away plan view of the illumination device of FIG. 3 in a commercial baking line.

FIG. 5 is a cut away plan view of the illumination device of the instant invention used in a commercial baking line. Dough balls 5 are arranged on the pans 100 top surface 220 in the pockets 210. The pans 100 are glazed with the non-stick enhanced visualization material EV coating 260 having the enhanced visualization materials therein as described above in relation to FIGS. 1-2. The conveyor 540 moves the pans 100 through a baking oven 3000. The oven bakes the buns in the pans 100. The buns are depanned at the depanning station 4000 ahead of the illumination and visualization system 500. The pans 100 are further conveyed to the illumination and visualization system or device or station 500 prior to moving to sorting and storage or separation for re-glazing. The illumination and visualization device 500 is the same as shown in FIG. 3. The resulting image can measure the wear of the release material coating or non-stick coating with the enhanced visualization material layer or EV coating 260 on the pan 100 or the existence of excess or foreign baked on material on any given pan 100 when the incident energy 280 is utilized and the material reacts to being illuminated by the energy with return energy 290 and the return is read by the camera 300 to form an image.

Similar to the illumination portion described in the coating machine in FIG. 3, emitter 270 illuminates the surface of the pan 100, with pockets of bun pan 210 extend from a top surface of bun pan 220. Incident energy 280, a non-limiting example being UV light, is emitted from the emitter 270 and is absorbed or reacts with the enhanced visualization material in the EV glaze 260 on the pan 100. The enhanced visualization material layer or EV coating 260 provides a re-emitted or reflected type of light upon re-admission in a known spectrum so as to illuminate or cause the EV coating 260 to reflect or emit light that will show the surface of the pan and or pan coating and more importantly anything adhering thereto from the baking process. This light 270 emits incident light 280 that is reflected or emitted 290 from the pan surface both the pan pockets 210 and the pan top surface 220 will be viewed from the camera or viewing device 300 that will be able to read the emitted and or reflected light 290.

In the case where there is offending material left on the pan 100, for instance but certainly not limited to baked product or elements of a baked product lying on the top of the pan 100 due to improper removal by an automated depanner, then the material could be manually removed, and the pan put back into operation. Seeds and other types of non-desirable adhering material will show as localized dark spots to the light receiving device 300 where the light receiving device 300 will be able to be programmed so as to view these dark spots on the pan and reject the pan for possible stripping and recoating. It may also be the case that the light receiving device will also see or pick up a dark spot that may not be a seed or baked on debris item which would block out emitted light or block generated light from being given off and returning to the light receiving device in this case it could be that the release coating has been damaged or mechanically removed by wear in t the pan. The pan is viewed and then acted upon, typically being rejected or deemed unacceptable for re-use until corrected or re-glazed. A variety of illustrative results showing types of image returns emblematic of various scenarios are explained further in FIGS. 5A-6C.

Figure 5A:
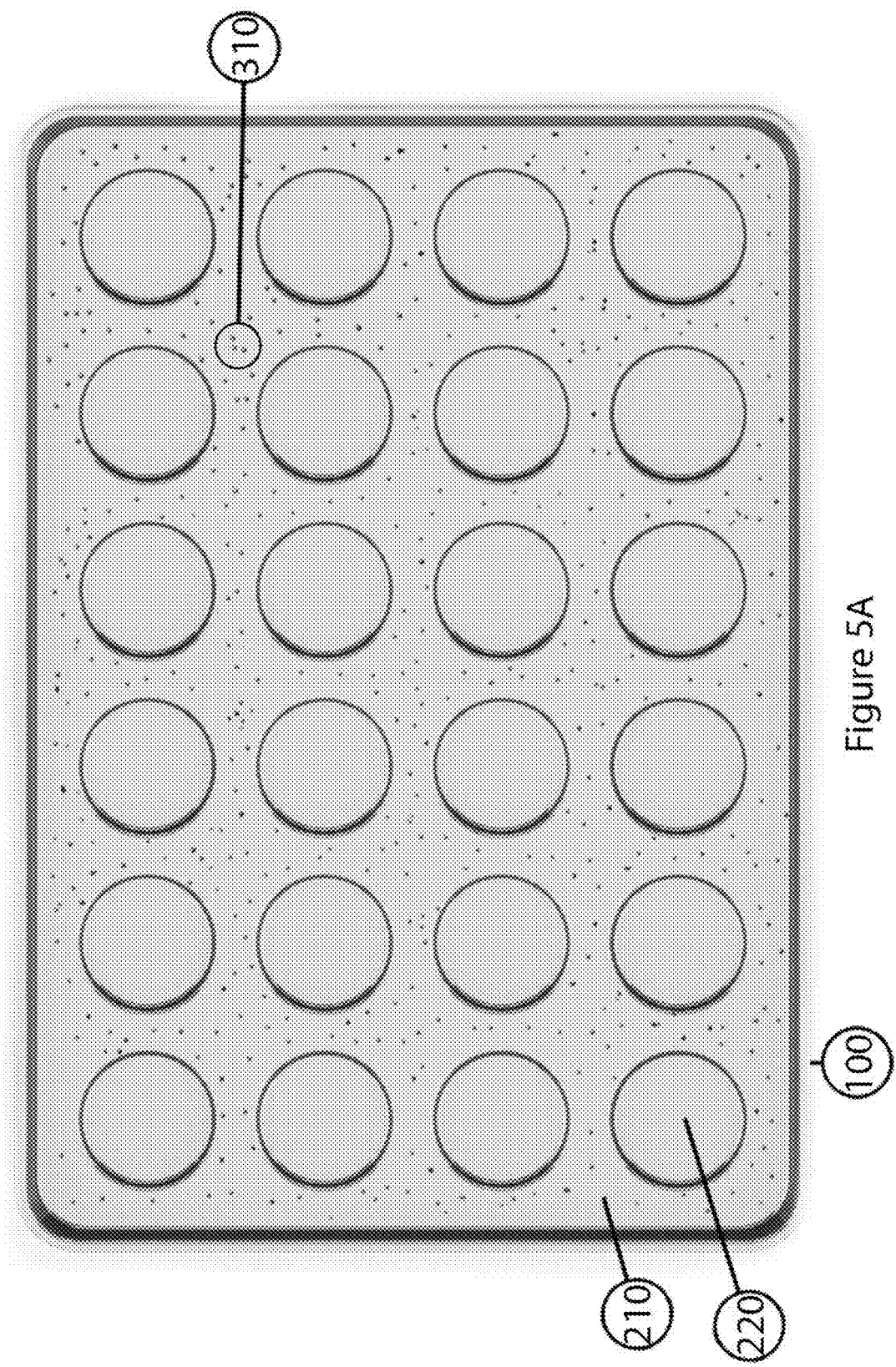
FIG. 5A shows a top down view of an image of a pan having adhered seeds from the exemplary embodiment of FIG. 5.

FIG. 5A shows a top down view of an image of a pan having adhered seeds from the exemplary embodiment of FIG. 3. FIGS. 5A-6C show and reference images taken by the instant invention as shown in FIG. 3 and reference is made to EV coating 260. Though not specifically called out in each figure, as the EV coating 260 is on the entirety of the pan 100, it is the variation in intensity or dark spots or absence of the EV coating 260 that are indicative of changes in this coating as shown in the images and the existence of the coating is asserted as shown in FIG. 3. This bonded on seed scenario occurs most often where the application of seeds onto the bun surfaces that is accompanied by water that is sprayed on the proofed but not baked buns to act as a bonding material to bond the seeds 310 onto the surface of the unbaked bun. In this seeding process there will typically be excess water as well as seed applied to the bun so that full coverage of the bun is attained. There are some seeds 310 that are not optimally placed and will fall onto the pan surface area around and some into the pan pockets 210, 220. The seeds or topping materials 310 will typically appear as speckles or dark spots to the camera 300 for area covered by the seeds 310 or topping materials. This bonded on seed is considered an allergen and can cause allergen concerns.

Additionally, the seeds may become repeatedly baked on the pan and will blacken and may flake off or bake onto product, causing a negative appearance and a burnt taste. As noted in the description of the previous FIG. 3 where the light being emitted 280 does not reach the surface of the pan 100 where it can react with the additive layer in the release agent in the pan EV coating 260. The seeds or topping material 310 that are on the surface of the pan 100 will absorb and/or block the incident light 280 from reaching and reacting with the pigment in the release or EV coating 260 and thereby stop the reflected or reemitted light 290 on the surface of the pan 100. The resulting area that is blocked can be easily visualized by the receiving camera 300 or if phosphorescent in the visible spectrum the naked eye of an operator as specks or a speckled pattern as shown.

This topping material or seed debris 310 can also be only partially adhered, with a high probability that it may become dislodged through light vibration or any type of mechanical interaction of pans 100 being handled in normal post baking operations, such as but not limited to stacking, unstacking, movement on conveyors, transfer of conveyors, mechanical indexing, cleaning, and other processes typical of commercial baking. A product portion can thus be unintentionally cross contaminated by debris dropped into pocket areas 210 which are filled with the portion for the purpose of proofing and baking. When this topping material or seed 310 as debris becomes dislodged or no longer bonded to the pan release surface 260 it can find its way into or under product. As a potential allergen and contaminant both from a visual and a taste perspective in the product being baked, detecting this residual topping material or seed debris 310 is one of the most important targets to be detected and has an additional quality control function as an indicator of the performance of cleaning process being carried out after the baking process.

Figure 5B:
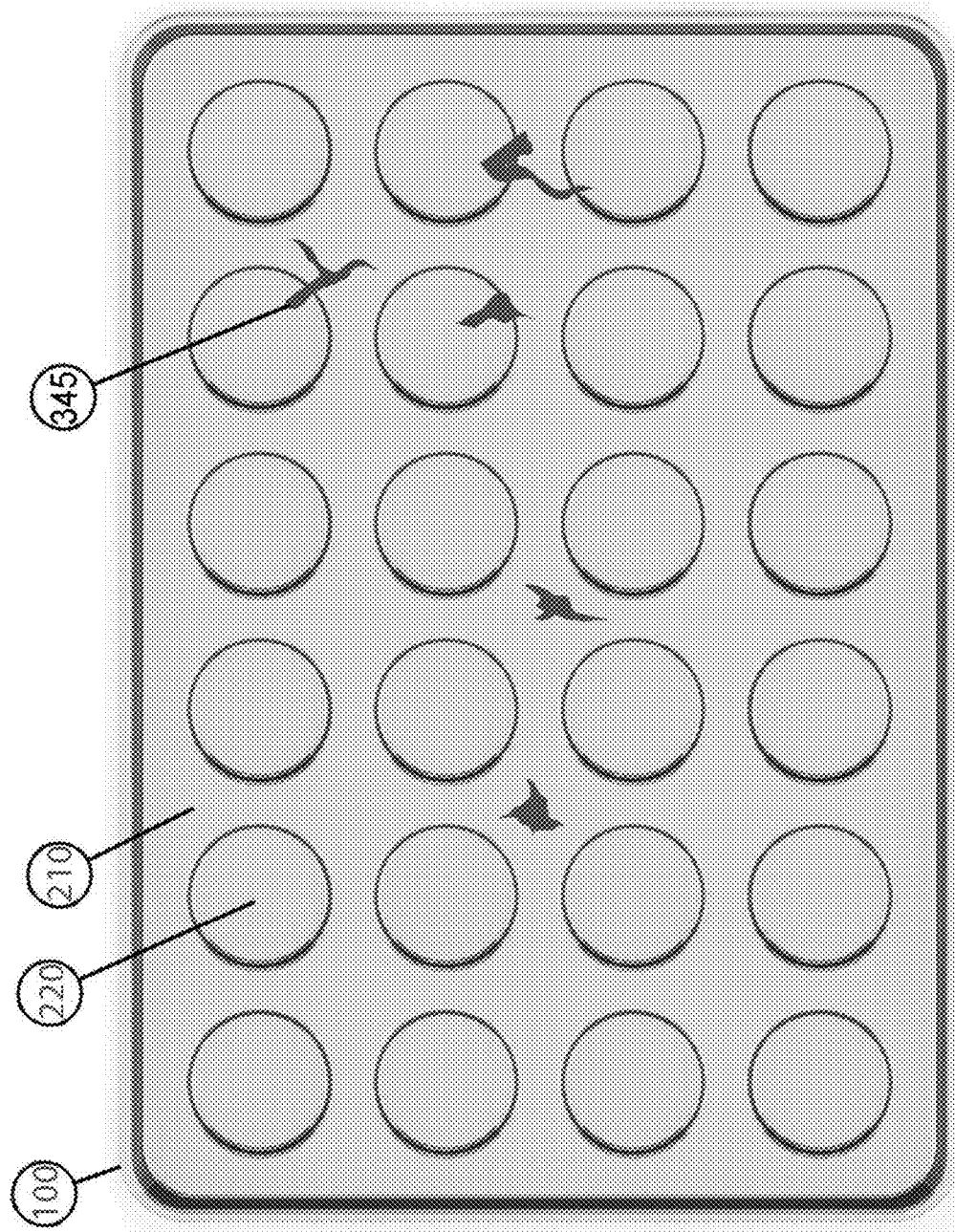
FIGS. 5B and 5C show top down views of an image of a pan having adhered bun glazing from the exemplary embodiment of FIG. 5.
Figure 5C:
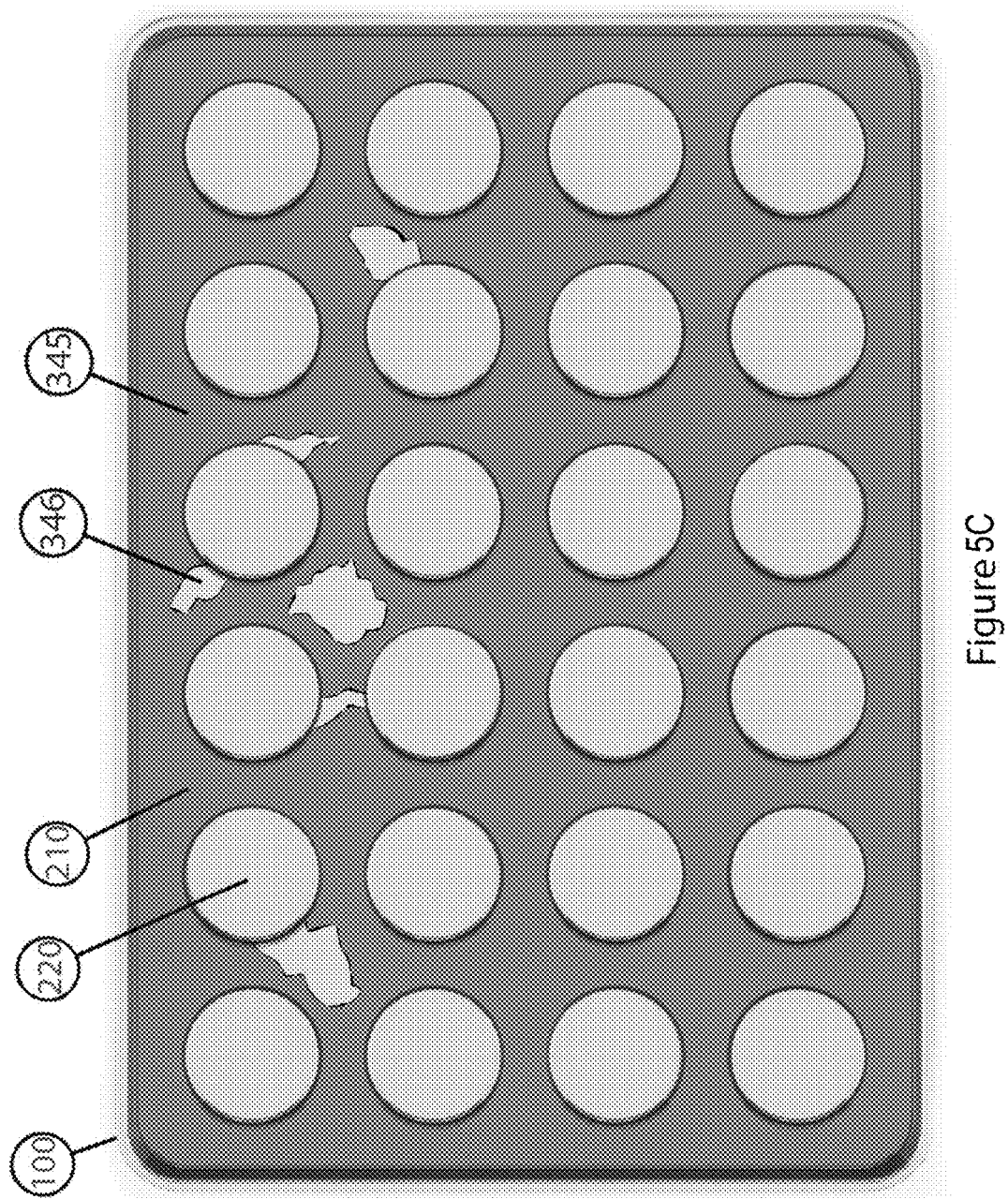

FIGS. 5B and 5C show top down views of an image of a pan having adhered bun glazing from the exemplary embodiment of FIG. 5. In some instances a glaze can go onto the buns to give them a shiny appearance can remain on pans 100. Again the glaze 345 is sprayed on pans, so that the buns will get a uniform coverage but there will always be some excess of this glaze 345 that will deposit onto the upper pan surface 220. This oversprayed glaze 345 when it bakes becomes a sticky material and will continue to harden upon cooling where it will harden to be much like a varnish. This appears as a dull application of a slightly darker coloration on the image as shown. When this occurs the oversprayed glaze 345 tends to shrink on final cooling and drying and peel from the surface of the pan. Sometimes the oversprayed, baked on, and burnt glaze 345 can peel partially, forming flakes 346 as shown in FIG. 5C. In both of these conditions the release coating of the pan is still in reasonably effective condition. However, at this time it is important to remove these semi and partially adhering dried glaze materials so that on the next trip to the oven the material does not form the flakes 346, which can float into the bottom of the pan pocket 210 and bond to the next deposited dough portion.

Figure 5D:
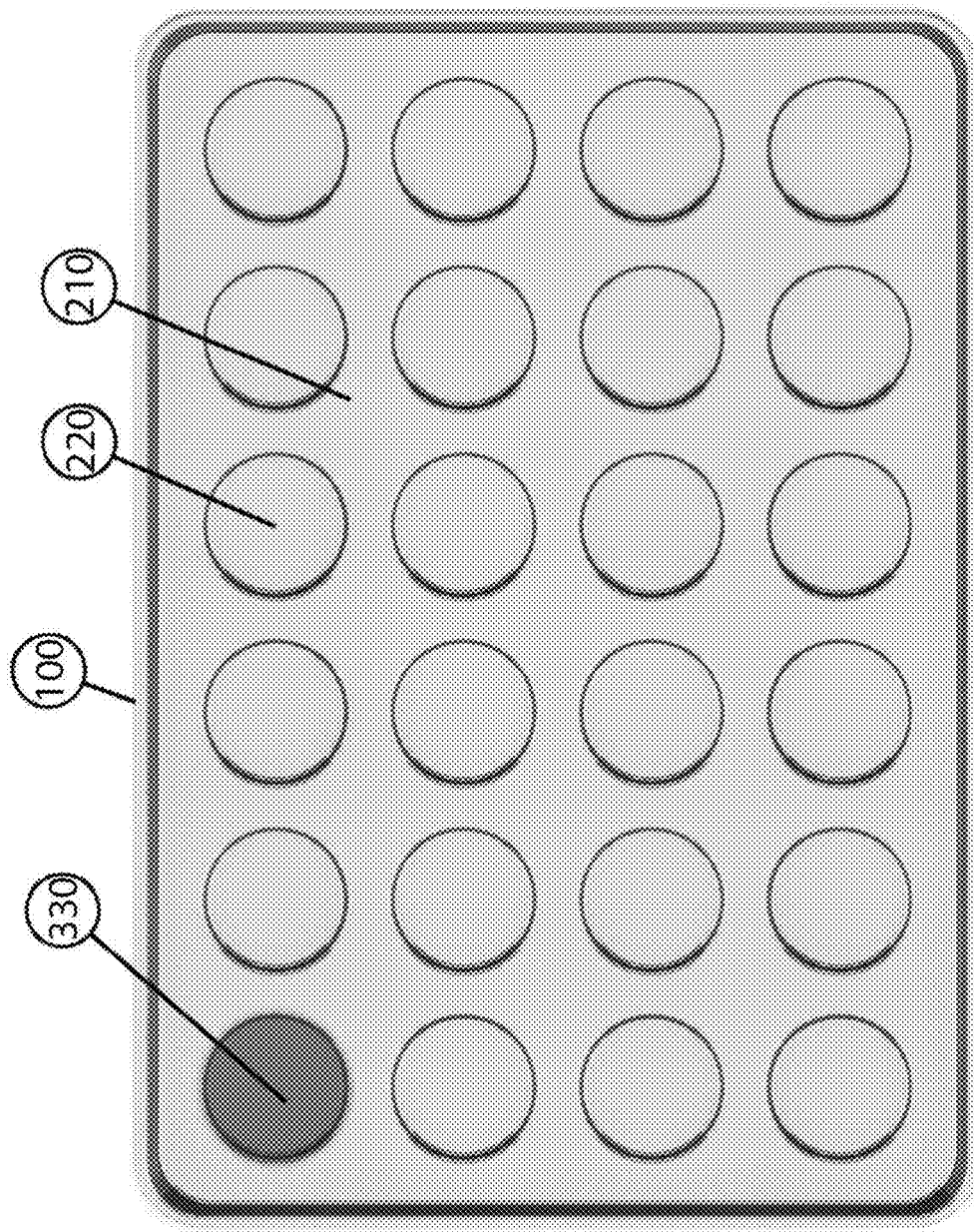
FIG. 5D shows a top view of an image of a pan having an unreleased product from the exemplary embodiment of FIG. 5.

FIG. 5D shows a top down view of an image of a pan having an unreleased product from the exemplary embodiment of FIG. 5. There is a significant dark spot 330 shown in or where typically a pocket 210 of the pan 100 is located. In this case the most probable reason is that product is lodged or remains in the pan pocket 210. In this case as in the case with the seeds 310 above, when the baked product does not release from the pan surface and the pan goes under the energy source or emitter 270 wherever the adhering product or other material remains on the pan surfaces 210, 220, the surfaces 210, 220 will not illuminate or luminesce and a corresponding dark spot 330 appears in the visualization. In this example, the unreleased product will form a distinct, dense dark area 330 indicating the presence of something large being on the pan surfaces 210, 220. Typically, this would be a baked product that has not been removed from the baking pan surface. The cause of the adhesion however can be varied.

The cause of this failure to release could be as simple as the depanning operation shown in FIG. 5 not being correctly carried out and the object is just lying or sticking on the pan surfaces 210, 220 of the pan 100. It is also possible that the bun may have been partially lifted from the pocket but thru some issue the bun was not fully removed and may have fallen back into the bun pan pocket 210 of the bun pan 100. A further and related set of issues with the condition of the non-stick enhanced visualization EV coating 260 can also contribute to a failure of a product to release. As noted above, as the pan 100 is used the non-stick enhanced visualization material EV coating 260 wears, the pan 100 may no longer uniformly release the product. Additionally, as the pan 100 is used in the commercial baking process it is subject to physical contact and insult, e.g. it may be struck in such a way as to damage the non-stick enhanced visualization glaze 260. In either case, this causes the non-stick enhanced visualization EV coating 260 to become non-uniform.

Regardless of the cause, for a number of reasons, this non-uniformity in the non-stick EV coating 260 must be identified and the pan segregated from further use to avoid loss of product and to further properly identify those pans 100 that require re-glazing. Thus, in addition to identifying adhering product, the visualization and illumination device of FIG. 5 can also identify and segregate the pans with identified non-uniformity in the non-stick EV coating 260 layer. Non-limiting examples of image returns from such non-uniform non-stick EV coating 260 layers are shown in FIG. 6A, showing wear in the layer, and 6B showing damage from an impact to the layer.

The illumination and visualization device 500 of FIG. 5 can also be in communication with a sorting machine 600 or alternatively can be configured such that a pan 100 identified, for example, as having a sufficiently non-uniform surface application can be removed from service as part of a sorting process and removed from the system. This sorting operation can be operator driven or automated. The sorting operation may also be done independently from production to identify pans 100 that require re-glazing. It should be noted that in the non-limiting examples described herein in all instances, the machines and processes of the instant invention can be combined when and where appropriate. The simultaneous review of the results of illuminating and visualization after a baking process for debris to also perform an analysis to determine wear on the surface of the pan 100 as part of a sorting function is just one example. As noted above, by visualizing the condition of the non-stick enhanced visualization coating surface 260, a more efficient selection of pans needing re-glazing can be achieved with less impact to production capacity for the commercial baker is achieved.

When used to screen the condition of pans 100 and used to determine which pans 100 are being sent to be reglazed when damage or wear is found, the illumination and visualization device 500 operates as discussed in relation to FIGS. 4 and 5 above to develop an image of the pan 100. The use of the illumination and visualization device 500 in the sorting operation can thus, in a non-limiting example, be incorporated as part of the baking or food manufacturing process to simultaneously screen for debris as described above in relation to FIGS. 5-5C and simultaneously determine the condition of the non-stick EV coating 260 for re-glazing. The sorting process can also be conducted exclusive of producing baked goods to specifically review the condition of the pans 100.

As time and number of uses, plus number and degree of aggressiveness of pan cleaning increases then the condition of the non-stick EV coating 260 on the pan 100 will deteriorate and at a critical point it will need to be stripped and recoated. When subjecting the pan 100 to the energy emitter 270 as described in relation to FIG. 3 above and developing an image through the camera or image receiving device 300, if the pan surface 210, 220 emits a much lower degree of light or return energy over a wide area but is consistent, it is an indicator of the wearing of the non-stick EV coating 260. In operation it may be that a threshold value can be set so that pans 100 that do not emit a threshold value of light are removed from operation and sent out for stripping and re-coating.

FIG. 6A shows a top down image of a pan visualized by an exemplary embodiment of the device of FIG. 3 showing signs of wear. In this case on the upper pan surface 220 the non-stick EV coating 260 has thinned it will have a lessened effect on the light being reemitted or reflected 280 and being returned from the upper pan surface 220 and the pan pockets 210 in the thinned area. As seen in the figure, there are dark spots 355 in the cups. This is indicative of a non-stick EV coating 260 compromised thru multiple baking cycle approaching and which may be beyond the working lifespan of the applied non-stick enhanced visualization surface 260. In comparison if the condition of the non-stick EV coating 260 is good and undamaged, then the non-stick enhanced visualization surface will be thicker and uniform and will reflect or re-emit more uniformly the emitted light 290.

There is a disparity in the re-emitted light 290 as it comes off of the top surface 220 where some of the light will be brighter or more illuminated where the glazing has flaked off as compared to areas where the glazing is thicker and the re-emitted light 290 is less. The camera 300 in conjunction with a controller will be able to detect this discrepancy and a set point may be entered so that at a certain set point the pan will be rejected for segregation and removal followed by re-glazing.

FIG. 6B shows a further image of a pan 100 taken by the imaging and visualization device of FIG. 3 showing damage to the glaze from handling. It is sometimes the case that the pan 100 non-stick EV coating 260 can be worn from scratches, impacts and similar contact from rough handling, boxing, or similar conduct. Examples would be where an impact with an outside material would remove, gouge, shear or peel off part of the non-stick EV coating 260 and infused medium from the pan 100 non-stick EV coating 260. The image shows a significant and sharp localization having a lower than average return of energy 290 resulting in a long, cut like dark spot 265. Again, in this event the pan would be identified, removed from the system and sent out for repair, stripping and re-coating or replaced if damage is too great.

FIG. 6C shows a further image of a pan 100 taken by the imaging and visualization device of FIG. 3 showing deterioration from localized overheating. FIG. 6C shows a bun pan with dark spot 32 with a halo or gradient darkening region 330 around the darkest area. One non-limiting cause for this is overheating of the pan surface which occurs due to localized overheating, such as when the pan 100 is misloaded. This occurs when the pan 100 has not been uniformly loaded with product ahead of baking, where the product to be baked actually applies a degree of cooling to the pan surface. The non-stick EV coating 260 has a maximum temperature operating range and heating beyond this temperature causes the coating to deteriorate. It can be the case that to get a bake that is considered to be optimal requires a higher temperature for a decreased period of time as compared to other baking programs which can bake longer so as to have deeper heat penetration or have heat go deeper into the product. Often this higher operating bake temperature will cause increased or accelerated deterioration of the non-stick EV coating 260 if it were not for the effect of pan cooling by the heat absorbing properties of the products that need be baked off in the pan as well as insulative aspects where the products will shield or insulate the heat from going into the pan 100 and raise the temperature of the pan 100 to where damage or deterioration of the non-stick enhanced visualization surface may occur.

When this overheating occurs the pan glazing or EV coating 260 will start to darken which can also be responsible for increased absorption of the emitted light 280 and therefore a decrease in the reaction of the pigment as well as a degree of light absorption or re-radiated light 290 returning to the camera 300 so that the areas of damaged non-stick enhanced visualization surface will appear as darker zones 32 to the camera. These overheated zones will typically have decreased release capabilities as well as possible decrease in coating lifespan or failure or wear at an accelerated rate from normal.

This is also something that can be detected by a controller 450 and the pan 100 can at a set value be removed from circulation or operation so that it can be sent out for re-coating. This can be coupled to a machine logic controller 450 and the results can be displayed or stored or both. In this fashion, the quality and conformity of the non-stick EV coating 260 can be checked. The controller, as seen in FIG.

5, has a wireless communications dongle 475 so it can communicate with other sub-systems, such as the curing oven 2000, baking oven 3000, depanning station 4000, sorting station, and similar sub-components. The output from the illumination and visualization device 500 can aid in operations, be interconnected and cooperate with operations, or control operations of the sub-systems.

The controller 450 for the device can include a PLC (not shown) that is specifically programmed to review digitized values from the image derived from the image element or camera 300 and interprets data related to image field. These can include, but are certainly not limited to, representative values across the image of the brightness of individual elements of the image or subsets or combinations of these values for this data. This data can then be compared to stored variables or thresholds of data accessible by the controller 450.

These stored thresholds can be representative of a number of scenarios which can occur in the image and on the pan 100. These scenarios can be used to disqualify the pan 100 from further use and the pan 100 may be segregated through a fully automated system, partially automated system, or simply through human intervention in response to an indicator from the controller. These variables can for instance include, but certainly are not limited to, threshold values or conditions related to the coating condition and recoating status for each pan 100.

The variables or conditions identified can include but are certainly not limited to coating condition status a general weighted value representative of the pans coating condition not generally indicative of a rejection; recoating needed condition representing low volumes of coating in generalized locations on the pan; impact trauma condition a pan condition indicative of physical impact or damage where the release coating in a certain areas was removed or lost in significant points as seen in FIG. 6B; puncture conditions pockets where there is an absence of release coating due to one pan dropping where the corner of the pan falls onto or into the pocket of pan lying below it; bonded material conditions including indicators of seeds, seed locations and bonded on materials which can include a subset threshold for critical areas such as but not limited to pocket bottoms or corners of the pan, similar to the conditions in FIGS. 5A and 5B; overheating condition where areas are burned dark and coating is compromised as in FIG. 6C; worn coating condition where coating has worn off thru motion of hot hard surface of bun rubbing on glaze surface as seen in FIG. 6C; debris build up condition where glazing water spray which breaks down flour dust to become a bonding paste and then coats or bonds to pan as seen in FIG. 5A and glaze build up condition as see in FIGS. 5B and 5C causes light to be absorbed as well as reduce emission and be at a different color ranges as glaze absorbs light and filters light frequency or has a cracked or flaked off pattern in areas indicating glaze build up.

A condition or threshold value that is exceeded or that adds to a weighted matrix scoring of the condition of the pan can be used to determine if the machine will segregate the pan or not from circulation. This segregation again can be done through automated sorting or be done by hand with an indicator arising from the machine. An example of such a machine is shown in applicants co-pending application for a pan cleaner.

FIG. 7 shows a view from the camera that would typically show when surface and pigment of the non-stick EV coating is misapplied during application processing. As shown in the figure, the camera 300 shows a mild gradient in image, the difference in light re-emitted 290 from the upper pan surface 220 and the pan pocket 210 being shown as a slowly darkening gradient 340 into the thinner portion. Areas where the non-stick EV coating 260 emits light in a strong or bright manner will indicate that the coating is thick and more fully intact so as to react and convert the emitted light 280 to a light from that can be reflected or re-emitted 290 and sent to the camera 300. In this instance, the gradient effect is seen as a misapplication of the glaze during initial fabrication or re-glazing operations similar to those described FIG. 4 herein above. As detected, this pan should be rejected and reglazed or discarded.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A baking pan image capture system in a commercial baking manufacturing device, comprising:
   an image capture element;
   an incident light energy source emitting incident light energy;
   a treated baking pan having an enhanced visualization coating reacting to the incident light energy emitted by the incident light energy source and reflecting the incident light energy as reflected light energy from the pan and read by the image capture element; and
   a controller wherein the image capture element captures an image of the treated baking pan while in communication with the commercial baking manufacturing device and the controller analyzes the image of the pan determining a condition of the treated baking pan by variances in the reflected light energy.

2. The baking pan image capture system of claim 1, wherein the controller is further adapted to generate and review digitized value data from the image derived from the image capture element and interprets the digitized value data related to an image field against threshold values data representing an expected value for the image field for the pan.

3. The baking pan image capture system of claim 2, wherein the digitized value data is representative of values across the image field of at least the brightness of the incident light emitted and values of the reflected light energy measured for individual elements of the image or subsets or combinations of these values, wherein the controller is further adapted to analyze by calculating relative differences in the incident light energy brightness compared to the reflected light energy in the digitized data as the threshold value data.

4. The baking pan image capture system of claim 3, wherein in locations on the treated pan wherein the incident light energy emitted is not fully reflected from the treated baking pan and the reflected light energy does not appear at the expected brightness in the captured image field when compared to the expected threshold values by the controller when comparing the digitized values to the threshold values, an alert is triggered.

5. The baking pan image capture system of claim 2, further comprising an at least one memory storage device storing the thresholds values data and the stored threshold values being accessible by the controller as the expected value for the image field for the pan and the controller is further adapted to compare the threshold value to the digitized value data.

6. The baking pan image capture system of claim 5, wherein in locations on the treated pan where the incident light energy emitted is not fully reflected from the treated baking pan and the reflected light energy does not appear at the expected intensity in the captured image field when compared to the expected threshold values by the controller an alert is triggered.

7. The baking pan image capture system of claim 6, wherein the not fully reflected light is indicative of one of at least an adhering product and an area of significant wear in the enhanced visualization coating and the alert indicates this condition to an operator or to the controller.

8. The baking pan image capture system of claim 2, further comprising a commercial baking pan cleaning system in communication with the controller, whereby the image field and the digitized value data are indicating cleanliness of the pans in the commercial baking pan cleaning system.

9. The baking pan image capture system of claim 8, further comprising a sorting station, wherein the controller is adapted to review the image field and the digitized value data to determine the cleanliness of the pans in the commercial baking pan cleaning system and sorts the pans based on this determination.

10. The baking pan image capture system of claim 9, wherein the controller is further adapted to review the image field and the digitized value data to determine the state of treated baking pan and the enhanced visualization coating by the interpreted digitized value data related to the image field against the threshold values data representing an expected value for the image field for the pan to further determine the wear of the enhanced visualization coating and when wear of the enhanced visualization coating is determined or where a weighted matrix of variables in conjunction with the image data for the pan are detected and the controller determines the pan is worn, the controller further instructing the sorting station to sort the pan as a worn pan.

11. The baking pan image capture system of claim 1, wherein the incident light energy source emitting incident light energy emits light energy from at least one of the infrared spectrum, the visible light spectrum, and the ultra violet spectrum.

12. The baking pan image capture system of claim 1, wherein in addition to determining the condition of the enhanced visualization coating, the controller is further adapted to detect variances in the reflected light energy that represents contaminants adhered to the pan.

13. The baking pan image capture system of claim 1, wherein said contaminants further comprise at least one of an at least one adhered baking product, adhered parts of an at least one adhered baking product, and adhered additive components for an at least one baking product.

14. The baking pan image capture system of claim 1, wherein said adhered additive components are a food safe glaze or seeds.

15. The baking pan image capture system of claim 1, wherein the enhanced visualization coating further comprises an at least one non-stick coating material and the enhanced visualization coating is on at least the upper surface of the pan.

16. The baking pan image capture system of claim 15, wherein the at least one non-stick coating further comprises at least in part TEFLON.

17. The baking pan image capture system of claim 15, wherein the image of the enhanced visualization coating when analyzed by the controller further indicates the condition of the at least one non-stick coating material.

18. The baking pan image capture system of claim 1, wherein the enhanced visualization coating is one that fluoresces or phosphoresces or luminesces in the incident light.

19. The baking pan image capture system of claim 1, wherein the commercial baking manufacturing device is at least one of a commercial baking pan cleaning system, a commercial pan sorting conveyor, and a commercial baking indexing conveyor.

20. The baking pan image capture system of claim 1, wherein the controller analyzes and further displays an image of the condition of the enhanced visualization coating on the treated baking pan.

21. A baking pan image capture system in a commercial baking manufacturing device, comprising:
an image capture element;
an incident light energy source emitting incident light energy;
a treated baking pan having an enhanced visualization coating reacting to the incident light energy emitted by the incident light energy source and reflecting the incident light energy as reflected light energy which is read by the image capture element;
a controller wherein the image capture element captures an image of the treated baking pan in the commercial baking manufacturing device and detects abnormalities on the pan surface through the enhanced visualization coating.

22. The baking pan image capture system of claim 21, wherein said detected abnormalities on the pan surface further comprise at least one of one or more unreleased baking product, one or more broken parts of a baking product, one or more seeds, excess glaze adhered to the pan surface, damage to the coating, wear of the coating, imperfections in the coating and loss of the enhanced visualization coating.

23. The baking pan image capture system of claim 21, wherein said abnormalities are detected by the controller based on the intensity of the reflected light energy compared to the emitted light energy and the resulting comparison renders the image with the aberrations.

24. The baking pan image capture system of claim 23, wherein the image further comprises digitized data representing the abnormalities and the controller is further adapted to analyze the data representing the abnormalities and detects within the data a state of the enhanced visualization coating and identifies a condition from a set of variables associated with characteristic of the aberrations and the detected state of the enhanced visualization coating.

25. The baking pan image capture system of claim 24, wherein the condition identified by the controller includes a condition determined from a set of variables indicating at least one of: a coating condition status with a general weighted value representative of the enhanced visualization coating condition as being intact; a recoating needed condition representing low volumes of coating in generalized locations on the pan; an impact trauma condition wherein a state of the enhanced visualization coating is determined to be indicative of physical impact or damage due to the enhanced visualization coating in a certain area being removed or lost; bonded material conditions including indicators of seeds, seed locations and bonded on materials attach to the pan surface; an overheating condition where areas of the enhanced visualization coating are burned dark; a debris build up condition where glazing water spray and flour dust become a bonding paste that coats or bonds to the pan surface and effects the state of the enhanced visualization coating; and a glaze build up condition where glaze builds up and deteriorates the condition of the enhanced visualization coating.

26. The baking pan image capture system of claim 25, further comprising a sorting conveyor, wherein the controller based on the identified condition sorts the pan either into service or out of service.

27. A baking pan image capture system in a commercial baking manufacturing device, comprising:
   an image capture element;
   an incident light energy source emitting incident light energy;
   a treated baking pan having an enhanced visualization coating reacting to the incident light energy emitted by the incident light energy source and reflecting the incident light energy as reflected light energy which is read by the image capture element;
   a controller wherein the image capture element captures an image of the treated baking pan in the commercial baking device and analyzes the image of the pan the presence of contaminants or unreleased baked goods are detected.

* * * * *